(12) United States Patent
Fukada et al.

(10) Patent No.: US 11,038,222 B2
(45) Date of Patent: Jun. 15, 2021

(54) POWER STORAGE DEVICE

(71) Applicant: DENSO CORPORATION, Kariya (JP)

(72) Inventors: Masakazu Fukada, Kariya (JP);
Masashi Shiotani, Kariya (JP); Jiro Kameda, Kariya (JP); Kazuyuki Kato, Kariya (JP)

(73) Assignee: DENSO CORPORATION, Kariya (JP)

( * ) Notice: Subject to any disclaimer, the term of this patent is extended or adjusted under 35 U.S.C. 154(b) by 218 days.

(21) Appl. No.: 16/095,279

(22) PCT Filed: Apr. 3, 2017

(86) PCT No.: PCT/JP2017/013896
§ 371 (c)(1),
(2) Date: Oct. 19, 2018

(87) PCT Pub. No.: WO2017/183429
PCT Pub. Date: Oct. 26, 2017

(65) Prior Publication Data
US 2019/0140327 A1 May 9, 2019

(30) Foreign Application Priority Data
Apr. 21, 2016 (JP) .............................. JP2016-085099

(51) Int. Cl.
*H01M 10/617* (2014.01)
*H01M 10/658* (2014.01)
(Continued)

(52) U.S. Cl.
CPC ............ *H01M 10/617* (2015.04); *B60L 3/00* (2013.01); *B60L 3/0046* (2013.01); *B60L 9/18* (2013.01);
(Continued)

(58) Field of Classification Search
CPC .................... H01M 10/617; H01M 10/6567
See application file for complete search history.

(56) References Cited

U.S. PATENT DOCUMENTS 2,707,721 A * 5/1955 Anderson ............... H01M 2/10
429/100
2007/0248876 A1 10/2007 Ahn et al.
(Continued)

FOREIGN PATENT DOCUMENTS

| JP | 2001023703 A | 1/2001 |
| JP | 2003346924 A | 12/2003 |

(Continued)

*Primary Examiner* — Maria Laios
(74) *Attorney, Agent, or Firm* — Harness, Dickey & Pierce, P.L.C.

(57) ABSTRACT

A power storage device includes a storage battery that stores electric power, a battery management unit that monitors and protects the storage battery, an inverter configured to convert DC power outputted from the storage battery into AC power and outputting the AC power, and convert externally supplied AC power into DC power and supplying the DC power to the storage battery, a liquid storage container that houses therein the storage battery, the battery management unit, and the inverter in a state where surroundings of the storage battery, the battery management unit, and the inverter are filled with a liquid, a temperature adjustment unit that performs heat transfer between the liquid and outside air to adjust a temperature of the liquid to a particular target temperature, and a heat insulating material arranged to surround the liquid storage container.

12 Claims, 10 Drawing Sheets

(51) Int. Cl.
*H01M 10/6556* (2014.01)
*B60L 9/18* (2006.01)
*H01M 10/653* (2014.01)
*B60L 3/00* (2019.01)
*B60L 58/26* (2019.01)
*H01M 50/20* (2021.01)
*B60L 50/64* (2019.01)
*H01M 10/625* (2014.01)
*H01M 10/6567* (2014.01)
*H01M 10/635* (2014.01)
*F25D 19/02* (2006.01)
*B60L 50/60* (2019.01)
*B60L 58/24* (2019.01)
*H01M 10/42* (2006.01)
*B60K 6/28* (2007.10)

(52) U.S. Cl.
CPC ............ *B60L 50/60* (2019.02); *B60L 50/64* (2019.02); *B60L 58/24* (2019.02); *B60L 58/26* (2019.02); *F25D 19/02* (2013.01); *H01M 10/425* (2013.01); *H01M 10/625* (2015.04); *H01M 10/635* (2015.04); *H01M 10/653* (2015.04); *H01M 10/658* (2015.04); *H01M 10/6556* (2015.04); *H01M 10/6567* (2015.04); *H01M 50/20* (2021.01); *B60K 6/28* (2013.01); *B60L 2210/40* (2013.01); *B60L 2240/545* (2013.01); *B60Y 2200/91* (2013.01); *B60Y 2200/92* (2013.01); *B60Y 2306/05* (2013.01); *B60Y 2400/112* (2013.01); *F25D 2700/14* (2013.01); *H01M 2010/4271* (2013.01); *H01M 2220/20* (2013.01); *Y02T 10/70* (2013.01); *Y02T 10/72* (2013.01)

(56) References Cited

U.S. PATENT DOCUMENTS

| | | |
|---|---|---|
| 2009/0253028 A1 | 10/2009 | Takagi |
| 2011/0020676 A1 | 1/2011 | Kurosawa |
| 2011/0027625 A1 | 2/2011 | Payne |
| 2011/0027631 A1 | 2/2011 | Koenigsmann |
| 2011/0064983 A1 | 3/2011 | Yokoyama et al. |
| 2011/0214838 A1 | 9/2011 | Akiyama et al. |
| 2011/0316486 A1 | 12/2011 | Inaba et al. |
| 2012/0034507 A1* | 2/2012 | Harada ............... H01M 10/625 429/120 |
| 2012/0212170 A1* | 8/2012 | Matsui ............... H02M 7/5388 318/503 |
| 2014/0186661 A1 | 7/2014 | Payne |
| 2014/0332179 A1* | 11/2014 | Vandike ............... F28D 7/103 165/42 |
| 2014/0349153 A1 | 11/2014 | Ko |
| 2015/0380782 A1* | 12/2015 | Youngs ............... H01M 2/30 429/72 |
| 2017/0125860 A1* | 5/2017 | Chatroux ............. H01M 10/63 |

FOREIGN PATENT DOCUMENTS

| | | |
|---|---|---|
| JP | 2008047371 A | 2/2008 |
| JP | 2008204764 A | 9/2008 |
| JP | 2009009730 A | 1/2009 |
| JP | 2009037934 A | 2/2009 |
| JP | 2009515312 A | 4/2009 |
| JP | 2009259785 A | 11/2009 |
| JP | 2010050000 A | 3/2010 |
| JP | 2010539667 A | 12/2010 |
| JP | 2011178321 A | 9/2011 |
| JP | 2012016078 A | 1/2012 |
| JP | 2013500574 A | 1/2013 |
| JP | 2013230024 A | 11/2013 |
| JP | 5769386 B2 | 8/2015 |
| WO | WO-2010032484 A1 | 3/2010 |

* cited by examiner

POWER STORAGE DEVICE

CROSS REFERENCE TO RELATED APPLICATIONS

This application is a U.S. National Phase Application under 35 U.S.C. 371 of International Application No. PCT/JP2017/013896 filed on Apr. 3, 2017. This application is based on and claims the benefit of priority from Japanese Patent Application No. 2016-085099 filed on Apr. 21, 2016. The entire disclosures of all of the above applications are incorporated herein by reference.

TECHNICAL FIELD

The present disclosure relates to a power storage device.

BACKGROUND ART

In recent years, with the spread of electric vehicles and hybrid vehicles, the demand for vehicle mounted power storage devices has increased. In addition, with the spread of HEMS (Home Energy Management Systems) that control the power use of buildings, the demand for stationary type power storage devices is also increasing. In any of these power storage devices, it is desirable to suppress deterioration of the internal storage battery as much as possible, and to operate for long periods of time without maintenance.

The power storage device (electric propulsion device) described in the Patent Literature 1 listed below has a configuration in which a storage battery and an inverter (power converter) are accommodated in the same casing. In addition, a coolant flow path is formed in the wall of the housing, and by circulating the coolant, it is possible to cool and warm the storage battery etc. In such a configuration, since temperature rise in the storage battery and the inverter is suppressed, deterioration of the storage battery, solder cracks in the inverter, etc. may be prevented. Thus, the power storage device may be operated over a long period of time.

PRIOR ART DOCUMENTS

Patent Document

Patent Literature 1: JP 5769386 B

SUMMARY OF INVENTION

In the power storage device described in Patent Literature 1, the internal space of the casing, i.e., the space accommodating the storage battery etc. is filled with air. As a result of detailed consideration by this inventor, depending on the arrangement of the storage battery and the inverter in such a power storage device, there is a possibility that the storage battery and the inverter are not uniformly and sufficiently cooled, thus resulting in uneven temperatures in some portions. Moreover, when humidity of the air is high, dew condensation may occur inside the casing, and there is a possibility that the operation of the inverter may be affected.

An object of the present disclosure is to provide a power storage device capable of operating over a long period of time without being affected by outside air temperature or humidity.

A power storage device according to one aspect of the present disclosure includes a storage battery that stores electric power, a battery management unit that monitors and protects the storage battery, an inverter configured to convert DC power outputted from the storage battery into AC power and outputting the AC power, and convert externally supplied AC power into DC power and supplying the DC power to the storage battery, a liquid storage container that houses therein the storage battery, the battery management unit, and the inverter in a state where surroundings of the storage battery, the battery management unit, and the inverter are filled with a liquid, a temperature adjustment unit that performs heat transfer between the liquid and outside air to adjust a temperature of the liquid to a particular target temperature, and a heat insulating material arranged to surround the liquid storage container.

According to the power storage device having such a configuration, the storage battery, the battery management unit, and the inverter are accommodated inside the liquid storage container, and are surrounded by liquid. As an example such a liquid, an insulating liquid such as a fluorine-based liquid may be used.

Heat is exchanged between the temperature adjustment unit and the storage battery etc. due to heat conduction through the above described liquid. As a result, the temperature of the storage battery etc. may be kept uniform at an appropriate temperature, as compared to a case where the storage battery etc. is surrounded by air. Since there is no air around the storage battery etc., condensation does not occur on the surface of the storage battery etc. In addition, since the liquid storage container is surrounded by the heat insulating material, temperature fluctuations in the liquid storage container due to the influence of outside air temperature may be further suppressed. As a result, the operation load of the temperature adjustment unit is reduced, so that the temperature adjustment unit may be reduced in size.

According to the present disclosure, a power storage device capable of operating over a long period of time without being affected by outside air temperature or humidity is provided.

DETAILED DESCRIPTION

Figure 1:
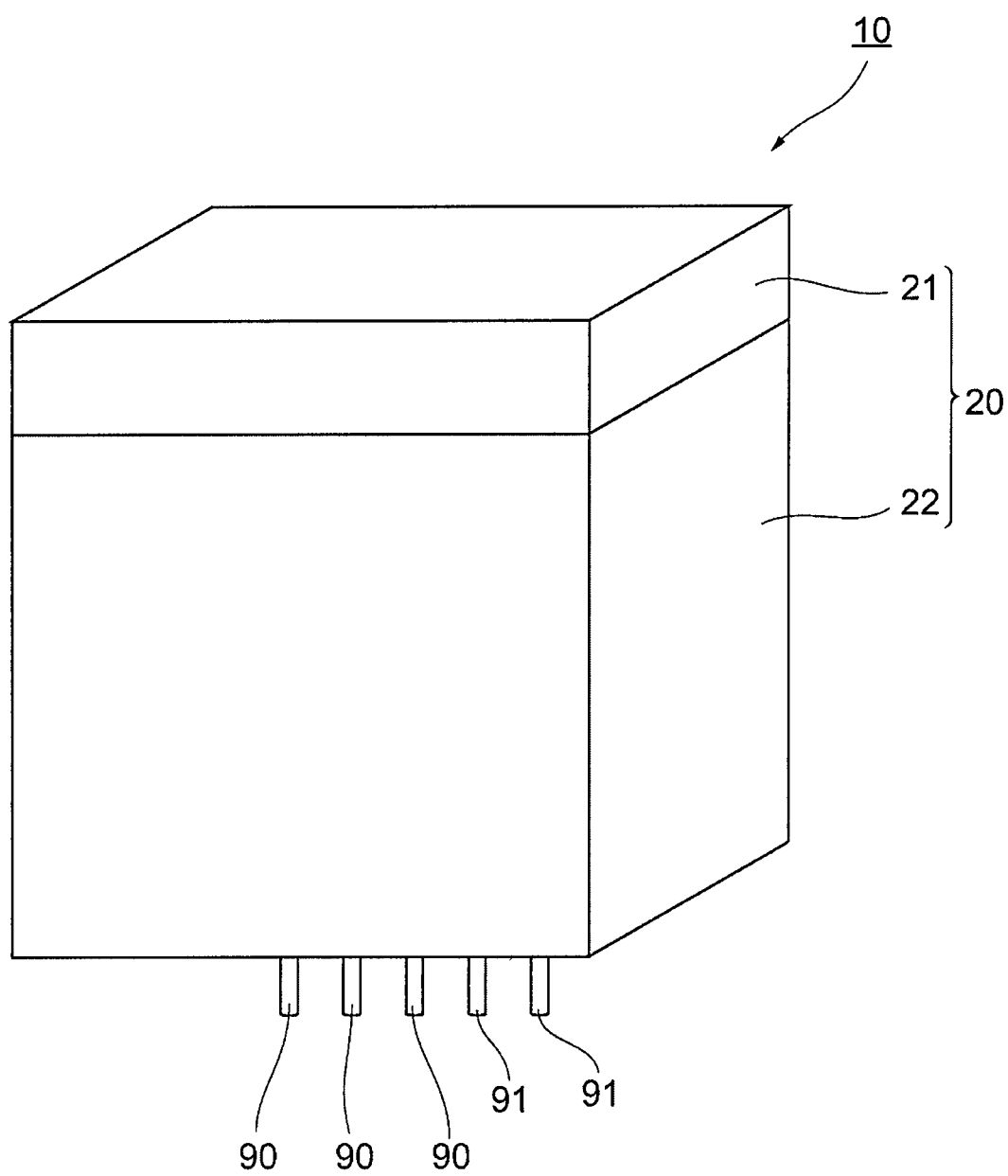
FIG. 1 is a perspective view showing an external view of a power storage device according to an embodiment.

Hereinafter, the present embodiments will be described with reference to the attached drawings. In order to facilitate the ease of understanding, the same reference numerals are attached to the same constituent elements in each drawing where possible, and redundant explanations are omitted.

A power storage device 10 according to the present embodiment is a vehicle-mount storage battery which is mounted on an electric vehicle. However, the power storage device 10 is not limited to this use. For example, the power storage device 10 may be used as a stationary type power storage device installed in a building as a part of the HEMS, or may be used as a power storage device installed in a base station for mobile phones.

Figure 2:
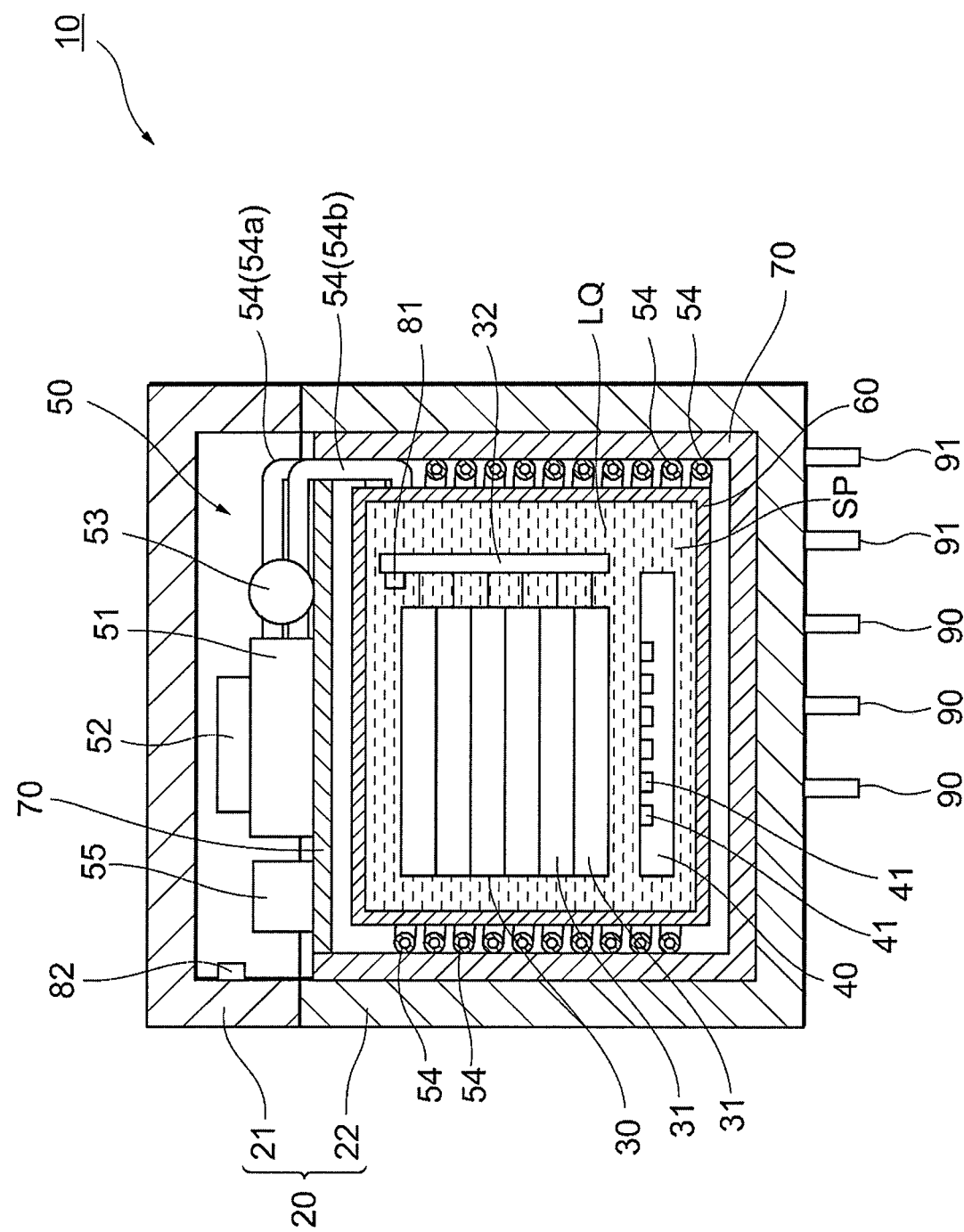
FIG. 2 is a cross-sectional view showing an internal structure of a power storage device.

The structure of power storage device 10 will be described. FIG. 1 shows the external appearance of the power storage device 10, and FIG. 2 shows its internal structure. The power storage device 10 has a configuration in which a storage battery 30 and the like are housed inside a case 20. On the lower side of the power storage device 10, i.e., on the lower surface of the case 20, three terminals 90 which are rod-shaped metal pins and two terminals 91 which are rod-shaped metal pins are also provided.

The power storage device 10 is capable of outputting three-phase AC power to outside from these terminals 90, and outputting DC power to outside from these terminals 91. In addition, the power storage device 10 is capable of receiving three-phase AC power supplied from the outside from the terminals 90 and to store this power in the storage battery 30. In addition, the power storage device 10 is capable of receiving DC power supplied from the outside from the terminals 91 and to store this power in the storage battery 30.

It should be noted that electric power input and output between the storage battery 30 and the terminals 90 is performed via the inverter 40. In addition, electric power input and output between the storage battery 30 and the terminals 91 is performed via a battery management unit 32 to be described later.

A specific configuration of the power storage device 10 will be described mainly with reference to FIG. 2. The power storage device 10 includes the case 20, the storage battery 30, the inverter 40, a temperature adjustment unit 50, a liquid storage container 60, and a heat insulating material 70.

As described above, the case 20 is a container that houses the storage battery 30 etc. therein. In the present embodiment, the case 20 is formed by aluminum die casting. The case 20 is divided into a main body portion 22 and a cover portion 21. The main body portion 22 is a portion for housing the storage battery 30 etc. therein, and an opening is formed on the upper surface of the main body portion 22. A portion of the temperature adjustment unit 50, which will be described later, protrudes up from this opening.

The cover portion 21 is a portion that covers, from above, the opening formed in the upper surface of the main body portion 22. The cover portion 21 covers, from above and from the sides, the temperature adjustment unit 50 protruding upward from the main body portion 22. A ventilation hole (not shown) is formed in the cover portion 21. As a result, the temperature and the humidity inside the case 20, and particularly inside the cover portion 21, are substantially equal to the temperature and the humidity outside the case 20.

The storage battery 30 is a portion for storing electric power. The storage battery 30 is configured to include a plurality of cell units 31 made of, for example, lithium ion batteries. The output voltage of the storage battery 30 is a safe voltage less than 60 volts and, specifically, is 48 volts.

The battery management unit 32 is disposed near the storage battery 30. The battery management unit 32 is a so-called BMU (Battery Management Unit) and is provided as a device for monitoring and protecting each cell unit 31. The battery management unit 32 corresponds to the "battery management unit" in the present embodiment.

The inverter 40 is configured to convert DC power output from the storage battery 30 into AC power and outputting this AC power from the terminals 90, and to convert external AC power supplied to the terminals 90 into DC power and supplying this DC power to the storage battery 30. In this manner, the inverter 40 functions as a bidirectional power converter.

The inverter 40 has a plurality of switching elements 41 that perform a switching operation for power conversion. In the present embodiment, a gallium nitride element (GaN) is used as the switching elements 41. As is well known, a gallium nitride element is a power device with a wide band gap, and losses caused by switching operations are extremely small. Therefore, the conversion efficiency of the inverter 40 is an ultrahigh efficiency of 99% or more, and heat generation during operation is extremely low. In addition, the overall shape of the inverter 40 is thin, and the inverter 40 is configured as a printed board type power converter.

In FIG. 2, a plurality of switching elements 41 are schematically drawn. Regarding the specific form of the switching elements 41 or the specific configuration of a switching circuit that includes the switching elements 41, well known implementations may be used, and thus figures and explanations related thereto are omitted for brevity.

The liquid storage container 60 is a container that accommodates the storage battery 30, the battery management unit 32, and the inverter 40 therein. In the present embodiment, the liquid storage container 60 is a bag-shaped container formed of an aluminum laminate film. A space SP inside the liquid storage container 60, that is, the space around the storage battery 30 etc., is filled with a liquid. As this liquid (hereinafter referred to as a "heat transfer liquid LQ"), a liquid which has relatively high thermal conductivity and which is electrically insulating is preferably used. As such a liquid, for example, a fluorine-based liquid, silicone oil, ultrapure water or the like can be used. In the present embodiment, Fluorinert (registered trademark), which is a fluorine-based liquid, is used as the heat transfer liquid LQ. A fluorine-based liquid is particularly suitable as the heat transfer liquid LQ because it has high thermal conductivity, will easily maintain electrical insulation, and also has flame retardancy. The liquid storage container 60 is hermetically sealed at atmospheric pressure in a state in which the inside of the liquid storage container 60 is filled with the heat transfer liquid LQ (i.e., in a state where absolutely no air exists).

Since air is eliminated from the vicinity of the storage battery 30, the battery management unit 32, and the inverter 40, condensation does not occur on these surfaces even if the humidity of the outside air is high. In addition, since ultraviolet rays, ozone, insects, and dust are prevented from entering the inside of the liquid storage container 60, failure or deterioration of the electric storage device 10 caused by these will not occur. Furthermore, since it is not necessary to disassemble or clear the power storage device 10 when being reused, the value of power storage device 10 can be kept high.

It should be noted that as the material of the liquid storage container 60, rather than an aluminum laminate film as described above, a hard material (for example, a metal such as aluminum) with no flexibility may be used instead. The liquid storage container 60 is preferably formed of a material having high thermal conductivity so that the temperature of the heat transfer liquid LQ inside can be easily adjusted.

However, when the liquid storage container 60 is formed of an aluminum laminate film as in the present embodiment, an effect of suppressing the transmission of electromagnetic waves via the liquid storage container 60 is exhibited. For example, according to the configuration of the present embodiment, malfunctions in the battery management unit 32 due to electromagnetic wave noise from outside, and electromagnetic wave noise generated in the inverter 40 leaking outside, are reliably prevented.

The temperature adjustment unit 50 is a unit that causes heat to move between the heat transfer liquid LQ and the outside air to adjust the temperature of the heat transfer liquid LQ toward a particular target temperature. The temperature adjustment unit 50 includes a heat exchanger 51, a fan 52, an electric compressor 53, a refrigerant pipe 54, and a controller 55. The temperature adjustment unit 50 is configured as a refrigeration cycle that causes heat to be transferred through the circulation of a refrigerant.

The heat exchanger 51 is a heat exchanger that performs heat exchange between outside air (specifically, the air inside the cover portion 21) and the circulating refrigerant. The heat exchanger 51 corresponds to an "external heat exchanger" in the present embodiment.

The fan 52 is a blower that sends surrounding air to the heat exchanger 51 so as to promote heat exchange in the heat exchanger 51. The electric power for driving the fan 52 is supplied from the storage battery 30 to the fan 52 via a power supply of the controller 55. The operation of the fan 52 is controlled by the controller 55.

The electric compressor 53 is a device that discharges refrigerant such that the refrigerant circulates between the heat exchanger 51 and the refrigerant pipe 54. The electric power for driving the electric compressor 53 is supplied from the storage battery 30 to the electric compressor 53 via a dedicated small inverter in the controller 55. The operation of the compressor 53 is controlled by the controller 55.

In one aspect of the present embodiment, the refrigerant pipe 54 is a pipe having a circular cross section, and is formed of a metal in the present embodiment. The refrigerant pipe 54 acts as a heat exchanger that exchanges heat between the refrigerant flowing therein and the liquid storage container 60 (together with the heat transfer liquid LQ inside the liquid storage container 60). The refrigerant pipe 54 corresponds to an "internal heat exchanger" in the present embodiment.

Figure 3:
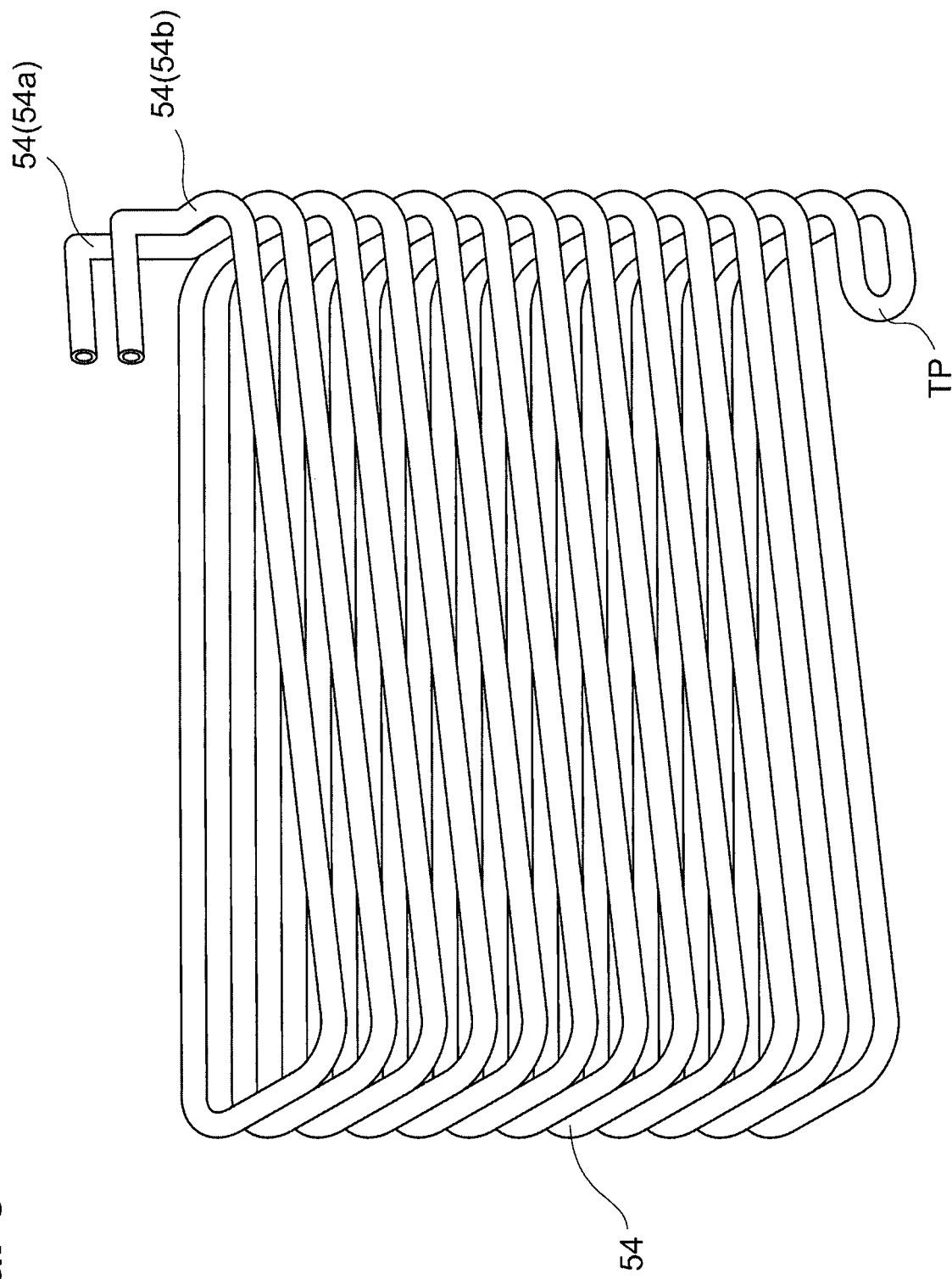
FIG. 3 is a perspective view showing a refrigerant pipe which is a part of a temperature adjustment unit.

The refrigerant pipe 54 is arranged so as to wrap around the periphery of the liquid storage container 60 over a plurality of windings. One end of the refrigerant pipe 54 is connected to the electric compressor 53. The other end of the refrigerant pipe 54 is connected to the heat exchanger 51 via a throttle valve (not illustrated). As shown in FIG. 3, the refrigerant pipe 54 is configured such that a first pipe portion 54a, which is a portion extending from the electric compressor 53, and a second pipe portion 54b, which is a portion extending from the throttle valve, are connected to each other at a turnaround portion TP on the lower side. The refrigerant flowing through the refrigerant pipe 54 circulates around the periphery of the liquid storage container 60, while undergoing temperature changes through heat exchange with the liquid storage container 60.

According to the temperature adjustment unit 50, it is possible to switch the path through which the refrigerant flows by means of a three-way valve (not shown). Thus, it is possible to switch between a cooling state in which the refrigerant pipe 54 functions as an evaporator and a heating state in which the refrigerant pipe 54 functions as a condenser.

In the above mentioned cooling state, the refrigerant flows in the order of the electric compressor 53, the heat exchanger 51 (condenser), a throttle valve (not shown), and the refrigerant pipe 54 (evaporator). At this time, the liquid storage container 60 is cooled through heat radiation to air, and the temperature of the heat transfer liquid LQ decreases.

In the above mentioned heating state, the refrigerant flows in the order of the electric compressor 53, the refrigerant pipe 54 (condenser), a throttle valve (not shown), and the heat exchanger 51 (evaporator). At this time, the liquid storage container 60 is heated by absorbing heat from the air, and the temperature of the heat transfer liquid LQ rises.

Regarding the structure of a refrigeration cycle capable of switching a flow path as described above, a well known configuration can be used. For this reason, explanations and illustrations of specific configurations such as the three-way valve arrangement or the routing of pipes are omitted for brevity.

The controller 55 is a portion that controls the operation of the fan 52, the electric compressor 53, and a three-way valve (not shown). The controller 55 is a system having a computer unit including a CPU, a ROM, etc., an inverter unit for an electric compressor, and a power supply unit for a fan. As a result of controls performed by the controller 55, the temperature of the heat transfer liquid LQ inside the liquid storage container 60 is maintained in the vicinity of a target temperature. Specific embodiments of this control will be described later.

The heat insulating material 70 is provided to suppress the transfer of heat between the liquid storage container 60 and the outside air. The heat insulating material 70 is arranged so as to surround the entire periphery of the liquid storage container 60. As shown in FIG. 2, most of the refrigerant pipe 54 (the portion functioning as an internal heat exchanger) is disposed inside the heat insulating material 70. In addition, the portions of the temperature adjustment unit 50 other than the refrigerant pipe 54 (i.e., the heat exchanger 51 and the like) are provided outside the heat insulating material 70.

As a result, the temperature of the liquid storage container 60 and the heat transfer liquid LQ inside the liquid storage container 60 is substantially not affected by the outside air temperature. In other words, only the heat generation of the storage battery 30, the battery management unit 32, and the inverter 40, which are housed inside the liquid storage container 60, causes temperature variations in the heat transfer liquid LQ. As a result, the operation load of the temperature adjustment unit 50 is relatively low, and the amount of energy required for operating the temperature adjustment unit 50 is also low.

As described above, the fan 52 and the electric compressor 53 of the temperature adjustment unit 50 operate by being supplied with electric power stored in the storage battery 30. However, since the amount of energy required for this operation is small as described above, the rate of reduction in the amount of stored electricity as a result of the operation of the temperature adjustment unit 50 is suppressed.

It should be noted that although the temperature adjustment unit 50, which operates using the electric power stored in the storage battery 30, may be configured as a refrigeration cycle as described above, the temperature adjustment unit 50 may have a different configuration instead. For example, heat transfer between the heat transfer liquid LQ and outside air may be performed by a Peltier element.

In the present embodiment, a vacuum heat insulating material is used as the heat insulating material 70. The specific structure of the heat insulating material 70 and the specific arrangement of the heat insulating material 70 inside the case 20 will be described later.

Next, other configurations will be described. The power storage device 10 further includes a liquid temperature sensor 81 and an outside air temperature sensor 82. The liquid temperature sensor 81 is a temperature sensor for measuring the temperature inside the liquid storage container 60, i.e., the temperature of the heat transfer liquid LQ. In the present embodiment, the liquid temperature sensor 81 is attached to the battery management unit 32. The temperature of the heat transfer liquid LQ measured by the liquid temperature sensor 81 is transmitted to the controller 55 of the temperature adjustment unit 50. This temperature is approximately equal to the temperatures of each of the storage battery 30, the battery management unit 32, and the inverter 40.

The outside air temperature sensor 82 is a temperature sensor for measuring the air temperature inside the cover portion 21. As previously described, a ventilation hole (not shown) is formed in the cover portion 21. Thus, the temperature measured by the outside air temperature sensor 82 is equal to the air temperature outside of the case 20, i.e., the outside air temperature. Accordingly, the outside air temperature sensor 82 functions as a sensor for detecting the outside air temperature. The outside air temperature measured by the outside air temperature sensor 82 is transmitted to the controller 55 of the temperature adjustment unit 50.

Figure 4:
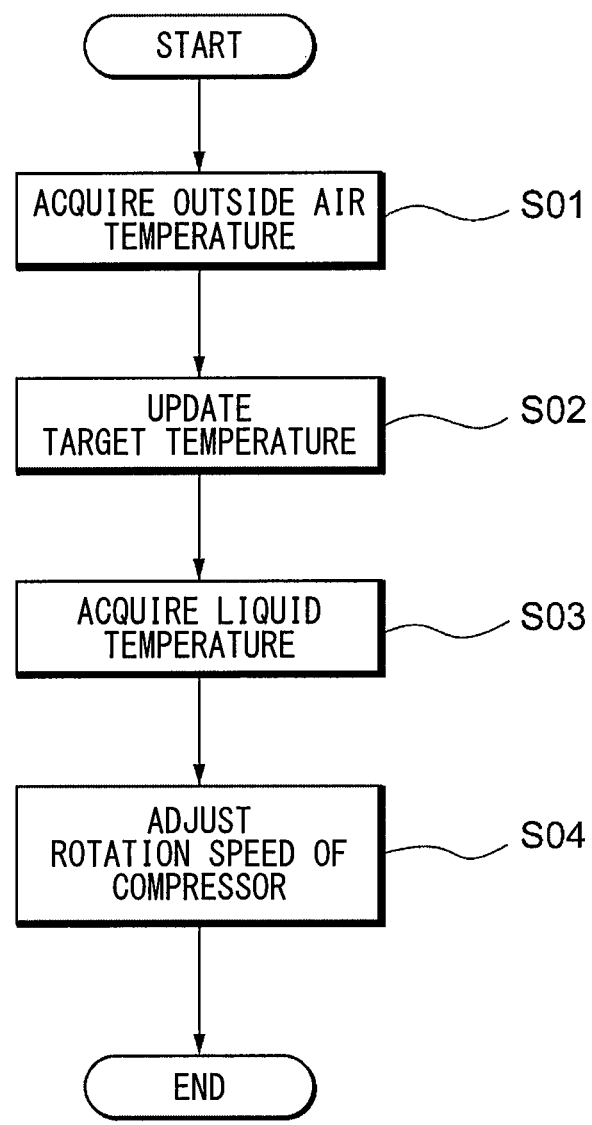
FIG. 4 is a flowchart showing the flow of a process executed by a temperature adjustment unit.

The details of the controls performed by the controller 55 will be described with reference to FIG. 4. The execution of the series of processing steps shown in FIG. 4 is repeated each time a predetermined period elapses. In the first step S01, the outside air temperature detected by the outside air temperature sensor 82 is acquired. After step S01, next in step S02, the target temperature is updated. The controller 55 changes the target temperature, which is a target value for the temperature of the heat transfer liquid LQ, based on the outside air temperature acquired in step S01.

Figure 5:
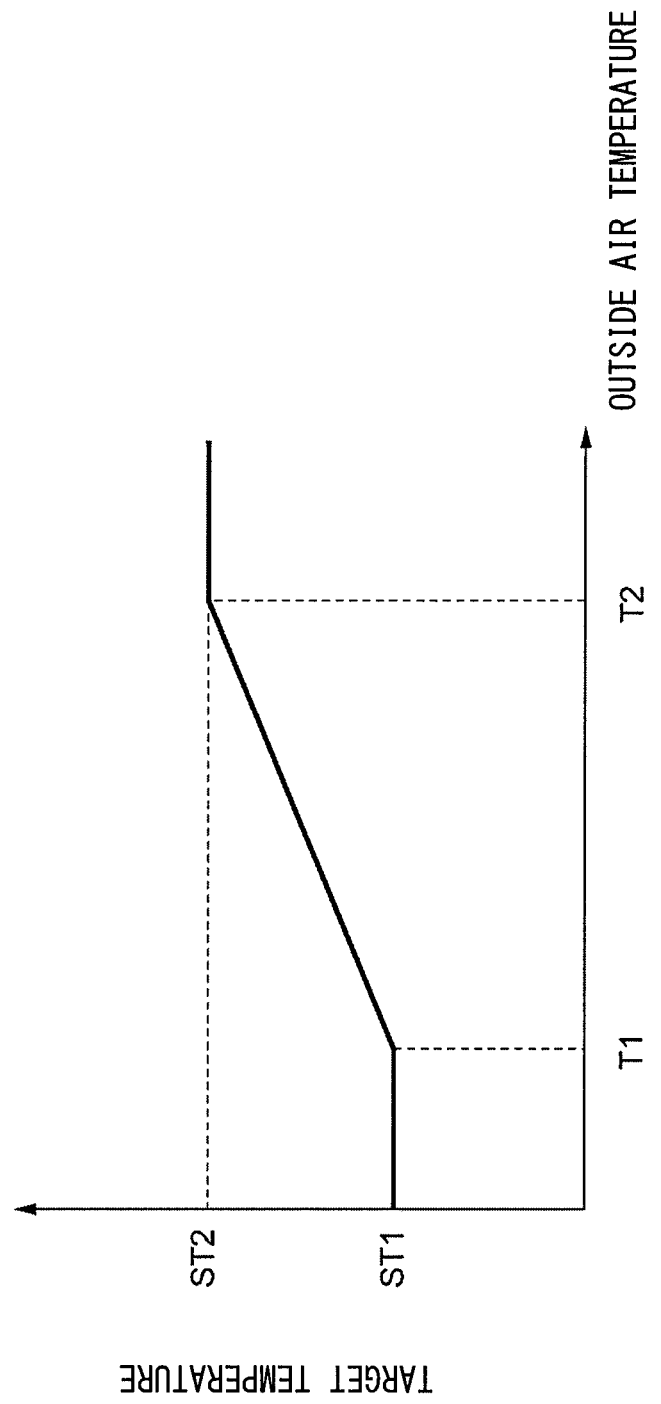
FIG. 5 is a diagram showing the relationship between outside air temperature and a set target temperature.

FIG. 5 shows the relationship between the outside air temperature and the set target temperature. As shown in the figure, when the outside air temperature is lower than a temperature T1, the target temperature is set to a lower limit value ST1. Further, when the outside air temperature is higher than a temperature T2 (>T1), the target temperature is set to an upper limit value ST2. When the outside air temperature is within the range between the temperature T1 and the temperature T2, the target temperature is set to a value which increases as the outside air temperature increases. In this regard, the temperature adjustment unit 50 changes the target temperature within a range from the lower limit value ST1 to the upper limit value ST2 based on the outside air temperature.

The target temperature is set to be high when the outside air temperature is high and the target temperature is set low when the outside air temperature is low. As a result, the difference between the outside air temperature and the target temperature does not become excessively large. The operation load of the temperature adjustment unit 50 becomes relatively low, and the power consumption by the temperature adjustment unit 50 is reduced. As a result, the rate of reduction in the amount of stored electricity in the storage battery 30 is further suppressed.

Returning to FIG. 4, explanation will be continued. In step S03 following step S02, the temperature of the heat transfer liquid LQ detected by the liquid temperature sensor 81 is acquired. In step S04 following step S03, the rotation speed etc. of the electric compressor 53 is adjusted based on the difference between the temperature of the heat transfer liquid LQ and the target temperature.

For example, when the temperature of the heat transfer liquid LQ is higher than the target temperature, the flow path of the refrigerant is switched such that the refrigerant pipe 54 functions as an evaporator. Further, as the temperature difference between the temperature of the heat transfer liquid LQ and the target temperature increases, the rotation speed of the electric compressor 53 is controlled to increase.

Conversely, when the temperature of the heat transfer liquid LQ is lower than the target temperature, the flow path of the refrigerant is switched such that the refrigerant pipe 54 functions as a condenser. In this case as well, as the temperature difference between the temperature of the heat transfer liquid LQ and the target temperature increases, the rotation speed of the electric compressor 53 is controlled to increase.

By performing such controls, a state in which the temperature of the heat transfer liquid LQ substantially coincides with the target temperature is maintained. Since the temperature of the storage battery 30 does not rise excessively, deterioration of the storage battery 30 can be suppressed, and the charge/discharge functions of the storage battery 30 can be maintained over a long period of time. In addition, since the temperature of the inverter 40 also does not rise excessively, defects caused by temperature rise, such as solder cracks in parts of the inverter 40, are prevented. As a result, the inverter 40 can also be operated normally over a long period of time. In addition, with respect to the battery management unit 32 as well, the occurrence of defects due to the temperature rise is similarly prevented. As a result, it is possible to extend the life of both the battery management unit 32 and the inverter 40, leading to a corresponding reduction in cost.

In the example of FIG. 4, the processing for changing the target temperature based on the outside air temperature (steps S01, S02) and the processing for matching the temperature of the heat transfer liquid LQ to the target temperature (steps S03, S04) are performed during the same cycle. As an alternative embodiment, each process may be executed at different cycles instead.

Figure 6:
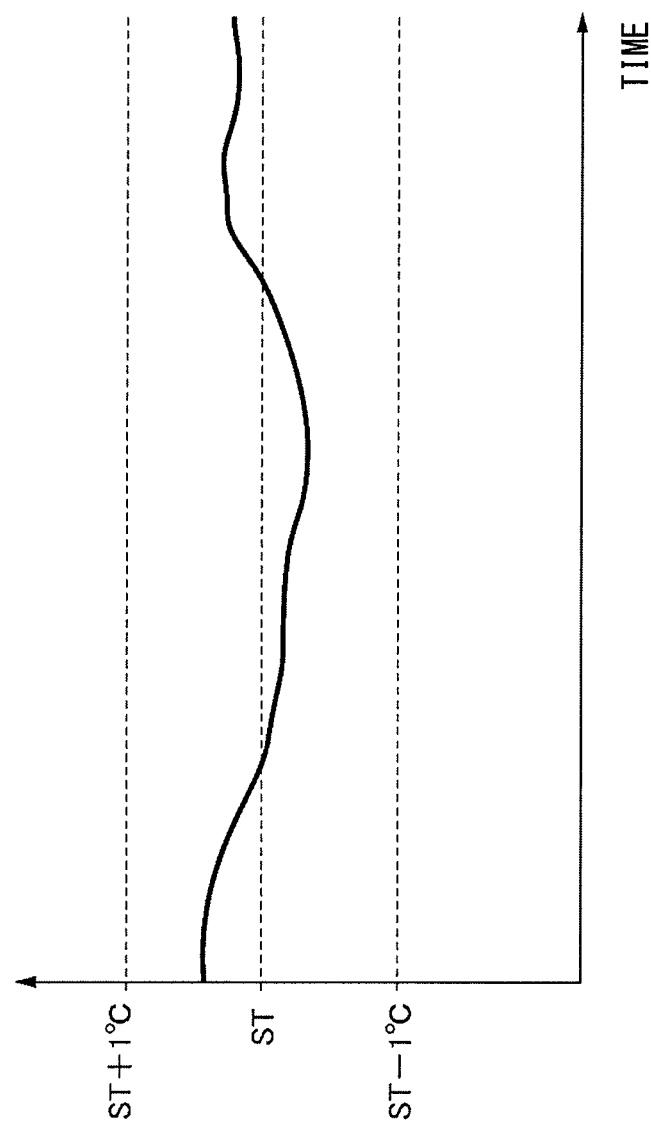
FIG. 6 is a diagram showing an example of temperature change inside a liquid storage container.

FIG. 6 shows an example of temperature changes in the heat transfer liquid LQ when the power storage device 10 is in operation. In the figure, the target temperature is shown as "ST". As shown in the figure, the temperature adjustment unit 50 controls the operation of the electric compressor 53 etc. such that the temperature of the heat transfer liquid LQ falls within the range of the target temperature ST±1° C. Such high precision control can be performed because heat is prevented from being exchanged between the liquid storage container 60 and outside due to the heat insulating material 70, and because the conversion efficiency of the inverter 40 is very high (i.e., the amount of heat generated from the inverter 40 is very small).

Figure 7:
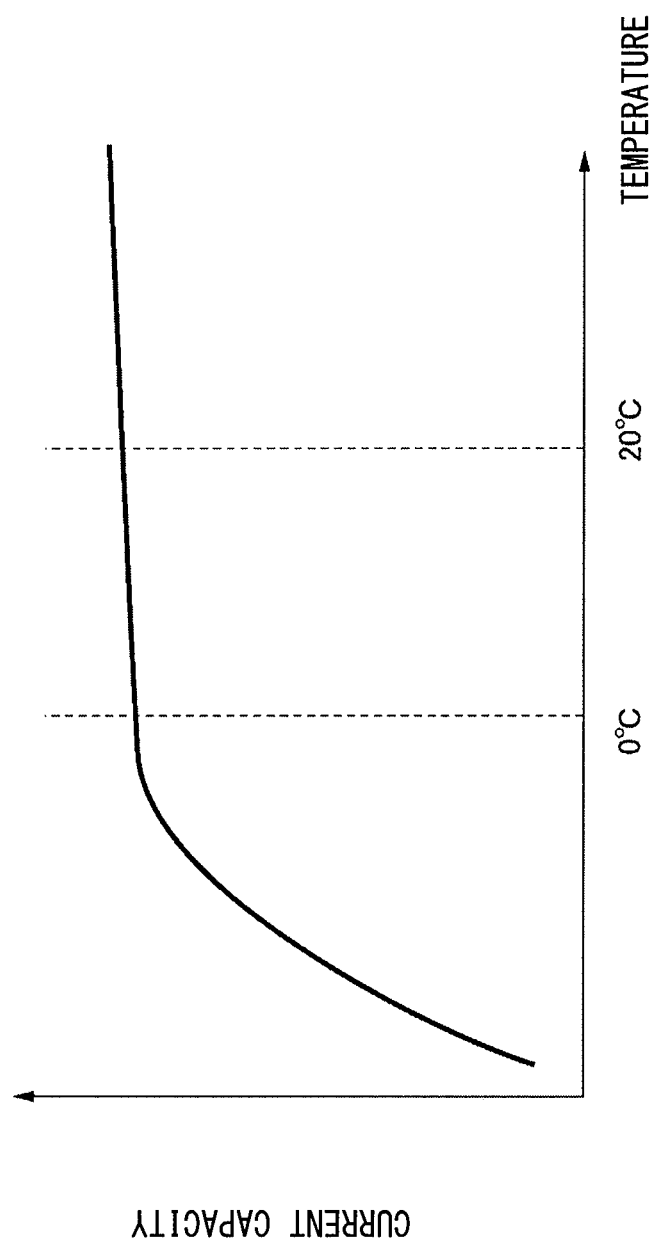
FIG. 7 is a diagram showing the relationship between temperature and current capacity of a storage battery.

FIG. 7 shows the relationship between the temperature and current capacity of the storage battery 30. As shown in the figure, when the temperature of the storage battery 30 becomes lower than 0° C., the current capacity capable of being input into or output from the storage battery 30 significantly decreases. When the temperature of the storage battery 30 is higher than 0° C., the current capacity of the storage battery 30 is sufficiently high and substantially constant.

When the temperature of the storage battery 30 remains higher than 20° C., degradation tends to occur. Therefore, in order to maximize the performance of the storage battery 30 over a long period of time, it is preferable to maintain the temperature of the storage battery 30 within the range of 0° C. to 20° C., and particularly within the range of 10° C. to 20° C.

Therefore, in the present embodiment, 10° C. is set as the lower limit value ST1 shown in FIG. 5, and 20° C. is set as the upper limit value ST2 shown in FIG. 5. In other words, the temperature adjustment unit 50 according to the present embodiment is configured to change the target temperature of the heat transfer liquid LQ within the range from 10° C. to 20° C. based on the outside air temperature. Thus, a state is maintained in which the current capacity of the storage battery 30 is sufficiently high and degradation of the storage battery 30 is suppressed.

Figure 8:
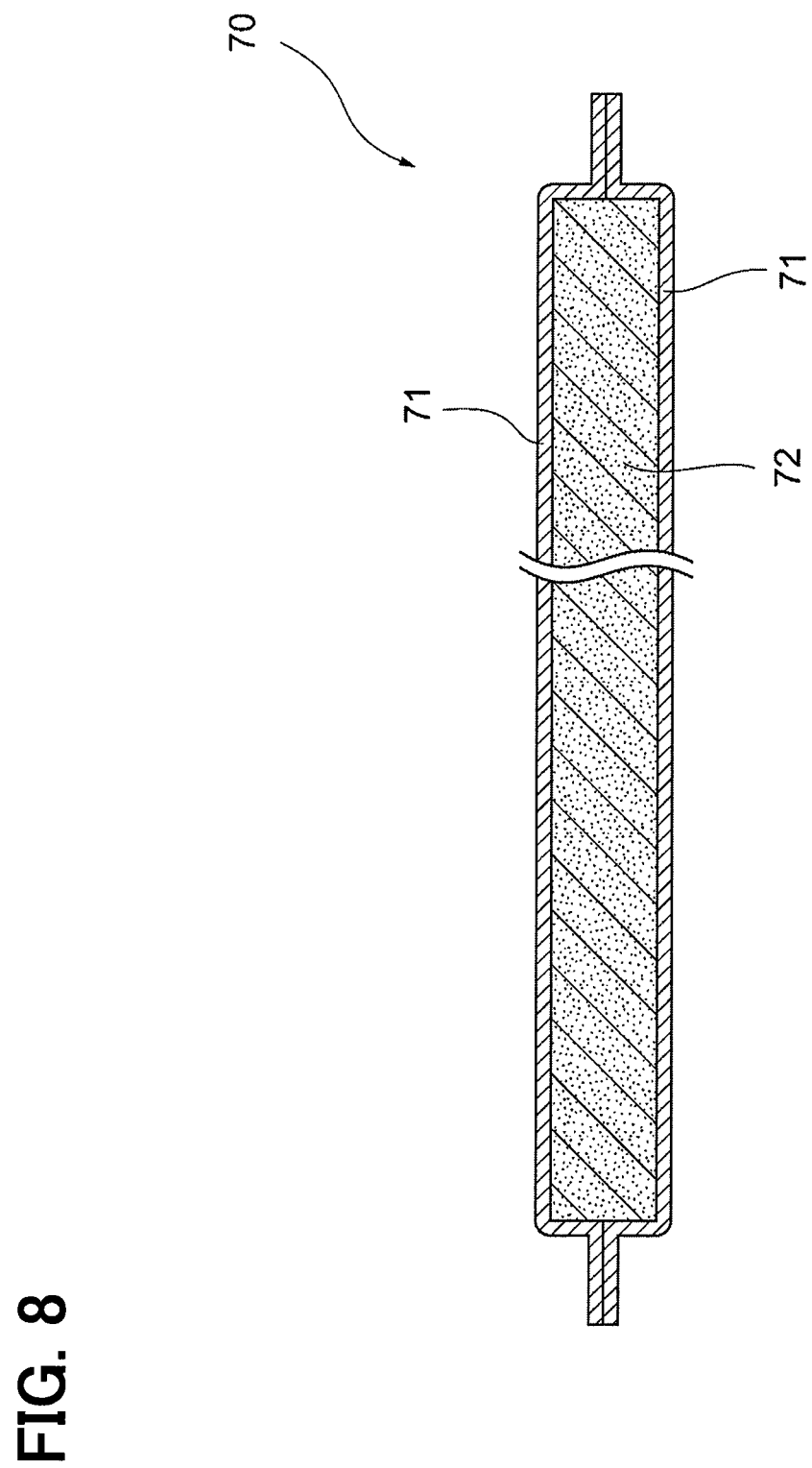
FIG. 8 is a cross-sectional view showing the internal structure of a vacuum heat insulating material.

The structure of the heat insulating material 70 will be described with reference to FIG. 8. The heat insulating material 70 includes sheets 71 and a core material 72.

Each sheet 71 is made of a material which is flexible and which has low gas permeability. In the heat insulating material 70, two sheets 71 are overlapped with each other and their ends are heat sealed, and the overall structure is a bag-shaped container.

The core material 72 is glass wool formed in a flat plate shape. The core material 72 is housed inside the bag-shaped sheets 71. In the heat insulating material 70, the bag-like sheets 71 are sealed in a state in which the internal space of the sheets 71, i.e., the space around and inside the core material 72 is decompressed. The heat insulating material 70, configured as a vacuum heat insulating material in this manner, is a relatively thin plate-shaped heat insulating material, but has an extremely high insulating performance.

In the present embodiment, the overall shape of the liquid storage container 60 and the refrigerant pipe 54 is substantially rectangular parallelepiped (hexahedron). Therefore, heat insulating materials 70 are disposed so as to surround the peripheries of these elements along six mutually perpendicular surfaces. In other words, a hexahedron is formed by combining the plate-shaped heat insulating materials 70, and the liquid storage container 60 and the refrigerant pipe 54 are arranged in the internal space of this hexahedron.

Figure 9:
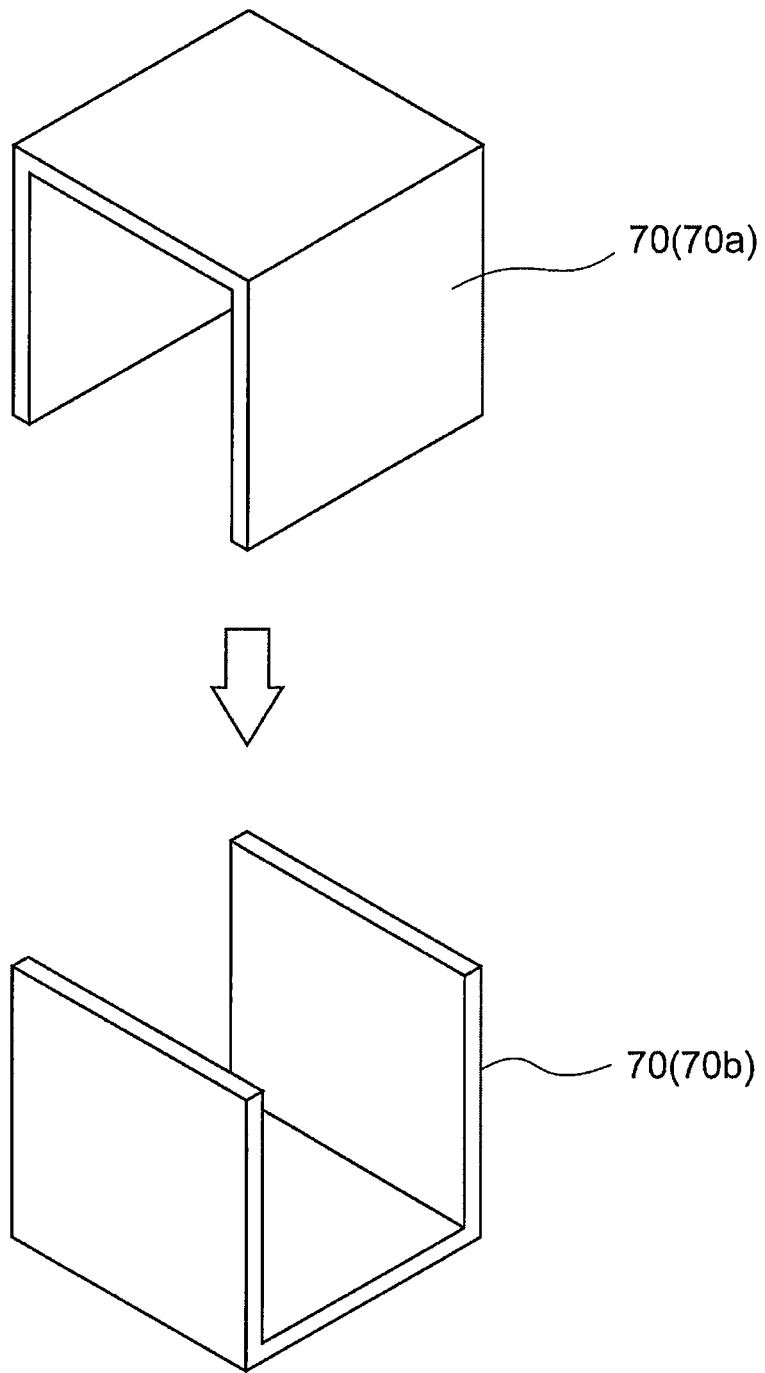
FIG. 9 is a view for explaining the arrangement of a vacuum heat insulating material inside a power storage device.
Figure 10:
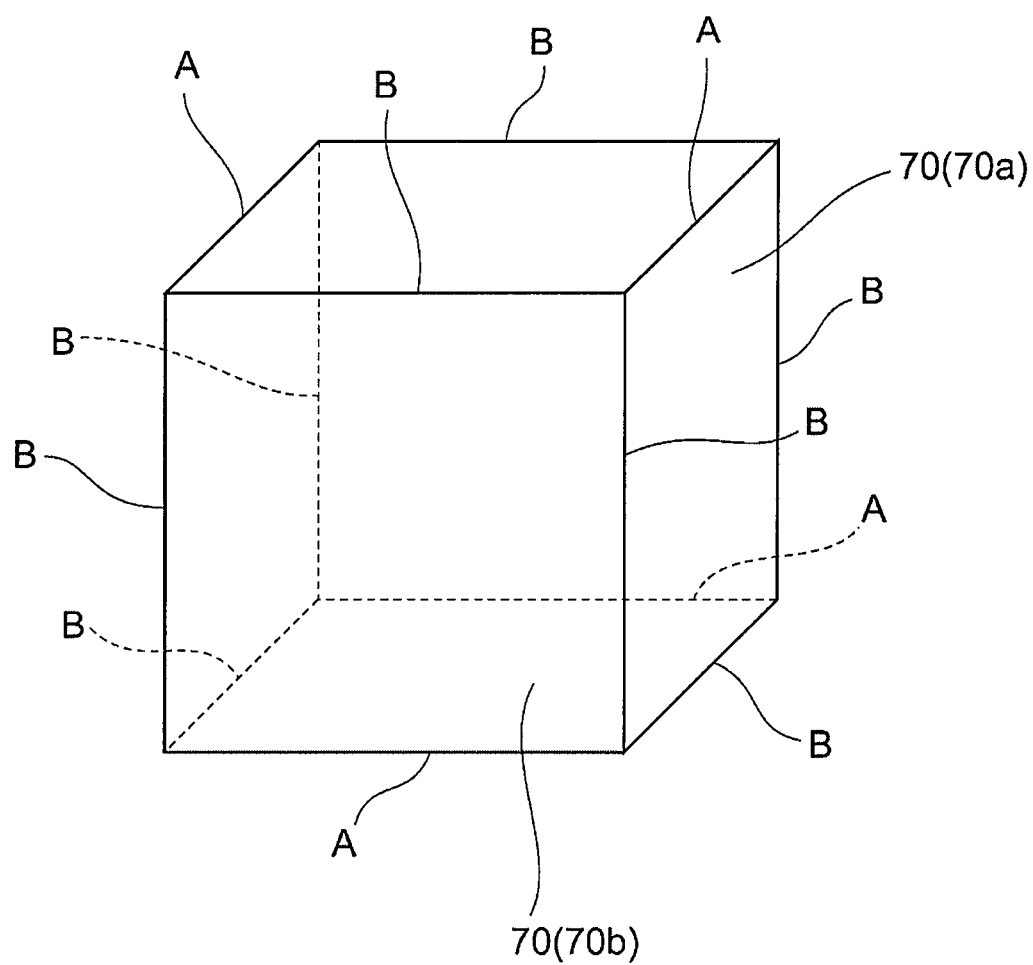
FIG. 10 is a view for explaining the arrangement of a vacuum heat insulating material inside a power storage device.

As shown in FIGS. 9 and 10, in the present embodiment, the hexahedron is formed by combining two heat insulating materials 70 (heat insulating materials 70a, 70b). In FIG. 9, the respective shapes of the heat insulating materials 70a and 70b are shown. FIG. 10 shows a state in which the above-described hexahedron is formed by combining the heat insulating materials 70a and 70b.

As shown in FIGS. 9 and 10, each heat insulating material 70a, 70b is bent vertically at two places. Further, in each of the heat insulating materials 70a, 70b, the two bending lines are parallel to each other. The bent heat insulating material 70a is arranged so as to cover three of the six surfaces of the hexahedron. Similarly, the bent heat insulating material 70b is arranged so as to cover the remaining three surfaces of the six surfaces of the hexahedron.

In this manner, in the present embodiment, a plurality of plate-like heat insulating materials 70 are arranged so as to surround the liquid storage container 60 along six mutually perpendicular surfaces. Specifically, each of the two heat insulating materials 70a, 70b is bent at two places, and each surrounds the periphery of the liquid storage container 60 over three surfaces.

As a method of forming a hexahedron by combining multiple heat insulating materials 70, various methods different from those described above can be adopted. For example, one heat insulating material 70 may be bent at three places, and that heat insulating material 70 may be arranged so as to extend over four of six surfaces. In this case, different heat insulating materials 70 are disposed on the remaining two surfaces.

Further, the hexahedron may be formed by combining six heat insulating materials 70. However, in this case, twelve edges are formed, which are the boundaries between adjacent heat insulating materials 70, i.e., edges through which heat may pass though because the core material 72 is not continuously arranged.

In the following description, the edges where heat may pass through as described above are referred to as "heat bridge edge B". In addition, the edges serving as the bends of the heat insulating materials 70, i.e., the edges where the core material 72 is continuously disposed inside the heat insulating material 70 so that heat does not pass though, are referred to as "heat insulating edge A".

As shown in FIG. 10, in the present embodiment, since the two heat insulating materials 70a, 70b each bent at two locations are combined, four heat insulating edges A are formed, and the number of heat bridge edges B is kept at 8 (i.e., fewer than the 12 described above). Therefore, the passage of heat between the inside and the outside of the hexahedron is sufficiently suppressed.

As described above, in the power storage device 10, the peripheries of the storage battery 30, the battery management unit 32, and the inverter 40 are filled with the heat transfer liquid, and the temperature adjustment by the temperature adjustment unit 50 is combined with the heat insulation effect of the heat insulating material 70. According to experiments conducted by the present inventors, by configuring the power storage device 10 in the above described manner, the service life of the power storage device 10 can be about doubled as compared with a conventional device. As a result, replacements within a short period are unnecessary, and the substantial cost of the power storage device 10 can be reduced to half.

The power storage device 10 described above may be changed or improved in various manners. For example, foam urethane may be filled in the space formed between the liquid storage container 60 and the heat insulating material 70, i.e., the space around the refrigerant pipe 54, to prevent the refrigerant pipe 54 etc. from shifting in position.

Further, in an alternative embodiment, a metal container that houses the liquid storage container 60 may be additionally provided, and the flow path of the refrigerant may be formed in the walls of the metal container. In this case, the flow path functions as the refrigerant pipe 54.

The devices that operate by receiving electric power from the power storage device 10 (for example, a rotating electrical machine or the like) may be integrally provided with the power storage device 10. For example, the storage battery 30 etc. included in the power storage device 10 and the above-described devices may be housed inside a shared case 20.

According to the present embodiment, only one set of the storage battery 30, the battery management unit 32, and the inverter 40 is disposed inside the liquid storage container 60. In an alternative embodiment, a plurality of sets of the storage battery 30, the battery management unit 32, and the inverter 40 may be arranged inside the liquid storage container 60. In such a configuration, there are two systems for charging and discharging electric power, and system redundancy may be achieved.

The present embodiments have been described with reference to specific examples above. However, the present disclosure is not limited to these specific examples. Those skilled in the art appropriately design modifications to these specific examples, which are also included in the scope of the present disclosure as long as they have the features of the present disclosure. The elements, the arrangement, the conditions, the shape, etc. of the specific examples described above are not limited to those exemplified and can be appropriately modified. The combinations of elements included in each of the above described specific examples can be appropriately modified as long as no technical inconsistency occurs.

What is claimed is:

1. A power storage device, comprising:
    a storage battery that stores electric power;
    a battery management unit that monitors and protects the storage battery;
    an inverter configured to
        convert DC power outputted from the storage battery into AC power and outputting the AC power, and
        convert externally supplied AC power into DC power and supplying the DC power to the storage battery;
    a liquid storage container that houses therein the storage battery, the battery management unit, and the inverter in a state where surroundings of the storage battery, the battery management unit, and the inverter are filled with a liquid;
    a temperature adjustment unit that performs heat transfer between the liquid and outside air to adjust a temperature of the liquid to a particular target temperature; and
    a heat insulating material arranged to surround the liquid storage container, wherein
    the heat insulating material is a vacuum heat insulating material having a structure in which a core material is housed in a container having flexibility, and the container is sealed in a state in which surroundings of the core material are decompressed,
    a plurality of the heat insulating materials, each formed in a plate shape, are arranged so as to surround the periphery of the liquid storage container along six mutually perpendicular surfaces, and
    at least one of the heat insulating materials is folded and this heat insulating material surrounds the liquid storage container over two or more surfaces.

2. The power storage device according to claim 1, wherein the temperature adjustment unit operates by receiving a supply of the electric power stored in the storage battery.

3. The power storage device according to claim 1, wherein the temperature adjustment unit is configured as a refrigeration cycle including
    an internal heat exchanger that exchanges heat between the liquid storage container and a refrigerant,
    an external heat exchanger that exchanges heat between the outside air and the refrigerant, and
    a compressor that causes the refrigerant to circulate between the internal heat exchanging portion and the external heat exchanging portion,
    the internal heat exchanging portion is disposed at a position inside the heat insulating material, and
    the external heat exchanging portion is provided at a position outside the heat insulating material.

4. The power storage device according to claim 1, wherein the liquid has insulating properties and flame retardancy.

5. The power storage device according to claim 1, wherein a conversion efficiency of the inverter is 99% or higher.

6. The power storage device according to claim 5, wherein the inverter includes a gallium nitride element.

7. The power storage device according to claim 1, further comprising:
    an outside air temperature sensor that detects an outside air temperature, wherein
    the temperature adjustment unit changes the target temperature in accordance with the outside air temperature.

8. The power storage device according to claim 7, wherein the temperature adjustment unit changes the target temperature within a range from 10° C. to 20° C.

9. The power storage device according to claim 1, wherein the temperature adjustment unit adjusts the temperature of the liquid so as to be within a range of the target temperature ±1° C.

10. The power storage device according to claim 1, wherein the number of the heat insulating materials is two, and each of the heat insulating materials is bent at two places and surrounds the periphery of the liquid storage container over three surfaces.

11. The power storage device according to claim 1, wherein the output voltage of the storage battery is a safe voltage of less than 60 volts.

12. The power storage device according to claim 1, wherein the number of the heat insulating materials is two, and each of the heat insulating materials has two fold lines to divide each of the heat insulating materials into a u-shaped structure with three distinct surfaces including a central surface disposed between two side surfaces, each of the two side surfaces extending away from the central surface at one of the fold lines in a same direction such that the two side surface are parallel to each other and perpendicular to the central surface.

* * * * *